(12) United States Patent
Walker

(10) Patent No.: US 7,865,518 B2
(45) Date of Patent: Jan. 4, 2011

(54) SYSTEMS AND METHODS FOR MANAGING IDENTITIES IN A DATABASE SYSTEM

(75) Inventor: Douglas Jock Walker, Springville, UT (US)

(73) Assignee: PresenceID, Inc., Salt Lake City, UT (US)

(*) Notice: Subject to any disclaimer, the term of this patent is extended or adjusted under 35 U.S.C. 154(b) by 57 days.

(21) Appl. No.: 11/865,898

(22) Filed: Oct. 2, 2007

(65) Prior Publication Data

US 2008/0082508 A1 Apr. 3, 2008

Related U.S. Application Data

(60) Provisional application No. 60/827,840, filed on Oct. 2, 2006.

(51) Int. Cl.
*G06F 17/30* (2006.01)
*G06F 15/173* (2006.01)

(52) U.S. Cl. .................. 707/770; 707/781; 709/224

(58) Field of Classification Search ............ 707/1, 707/3, 9, 10, 707, 758, 769, 770; 709/203; 713/165
See application file for complete search history.

(56) References Cited

U.S. PATENT DOCUMENTS

| | | | |
|---|---|---|---|
| 5,499,358 A | 3/1996 | Nevarez | |
| 5,581,749 A * | 12/1996 | Hossain et al. | ............. 707/10 |
| 5,608,903 A | 3/1997 | Prasad et al. | |
| 5,742,820 A | 4/1998 | Perlman et al. | |
| 5,758,344 A | 5/1998 | Prasad et al. | |
| 5,794,232 A | 8/1998 | Mahlum et al. | |
| 5,818,936 A | 10/1998 | Mashayekhi | |
| 5,893,118 A | 4/1999 | Sonderegger | |
| 5,933,826 A | 8/1999 | Ferguson | |
| 5,991,758 A * | 11/1999 | Ellard | ............. 707/6 |
| 6,105,062 A | 8/2000 | Andrews et al. | |
| 6,192,405 B1 | 2/2001 | Bunnell | |
| 6,438,594 B1 | 8/2002 | Bowman-Amuah | |
| 6,442,748 B1 | 8/2002 | Bowman-Amuah | |
| 6,446,253 B1 | 9/2002 | Mellmer | |
| 6,539,396 B1 | 3/2003 | Bowman-Amuah | |
| 6,601,234 B1 | 7/2003 | Bowman-Amuah | |
| 6,871,232 B2 | 3/2005 | Curie et al. | |
| 6,922,685 B2 * | 7/2005 | Greene et al. | ............. 707/1 |
| 6,981,043 B2 | 12/2005 | Botz et al. | |
| 6,993,508 B1 | 1/2006 | Major et al. | |
| 7,080,077 B2 | 7/2006 | Ramamurthy et al. | |
| 7,085,834 B2 | 8/2006 | Delany et al. | |
| 7,099,871 B2 | 8/2006 | Faybishenko et al. | |
| 7,103,676 B2 | 9/2006 | Payrits et al. | |
| 7,107,610 B2 | 9/2006 | Lortz | |

(Continued)

*Primary Examiner*—Miranda Le
(74) *Attorney, Agent, or Firm*—Austin Rapp & Hardman

(57) ABSTRACT

In a system for searching identity data, a first database includes a plurality of identity records. A computing device includes a processor and memory in electronic communication with the processor. An identity database is stored in the memory and is separate from the first database. The identity database includes the plurality of identity records. Each identity record includes at least two or more data elements. The identity database includes a plurality of past identity records. The past identity records are previous versions of the plurality of identity records. The identity database is searchable by applications in electronic communication with the computing device. The applications in electronic communication with the computing device cannot directly update the identity database.

6 Claims, 8 Drawing Sheets

U.S. PATENT DOCUMENTS

| | | | |
|---|---|---|---|
| 7,111,297 B1 | 9/2006 | Sankaranarayan et al. | |
| 7,113,994 B1 | 9/2006 | Swift et al. | |
| 7,114,037 B2 | 9/2006 | Agarwal et al. | |
| 7,143,082 B2 * | 11/2006 | Kamimura et al. | 707/3 |
| 2002/0174422 A1 * | 11/2002 | Kelley et al. | 717/178 |
| 2002/0184198 A1 * | 12/2002 | Kamimura et al. | 707/3 |
| 2002/0184243 A1 * | 12/2002 | Kamimura et al. | 707/200 |
| 2004/0225669 A1 * | 11/2004 | Isaacson et al. | 707/101 |
| 2005/0171872 A1 * | 8/2005 | Burch et al. | 705/29 |
| 2006/0149674 A1 * | 7/2006 | Cook et al. | 705/44 |
| 2006/0212935 A1 * | 9/2006 | Burman et al. | 726/12 |
| 2008/0005274 A1 * | 1/2008 | Subbanna et al. | 709/218 |
| 2008/0027761 A1 * | 1/2008 | Bracha | 705/4 |

* cited by examiner

SYSTEMS AND METHODS FOR MANAGING IDENTITIES IN A DATABASE SYSTEM

RELATED APPLICATIONS

This application is related to and claims priority from U.S. Provisional Patent Application Ser. No. 60/827,840 filed Oct. 2, 2006, for PRESENCE ID IDENTITY SEARCH BY IDENTIFIER DESCRIPTION, with inventor Douglas Walker, which is incorporated herein by reference.

TECHNICAL FIELD

The present invention relates generally to computers and computer-related technology. More specifically, the present invention relates to systems and methods for managing identities in a database system.

BACKGROUND

Computer and communication technologies continue to advance at a rapid pace. Indeed, computer and communication technologies are involved in many aspects of business operations. For example, a business may be located in numerous places with computers at each location. Computers may allow a business to maintain data relating to the business operations, customers, services, etc. Employees of a business may enter the data into the computers by utilizing business applications that run on the computers. Applications may also allow the employee to manage the data after it has been entered into the computer.

Data stored in a computer or a computer system is typically organized into a file, a database, or another type of data repository. It is not uncommon for an enterprise (e.g., corporation, small business, non-profit institution, government body, etc.) to have data stored in several different types of data repositories. There may be many reasons for this. For example, an enterprise may have inherited some data repositories as a result of mergers, acquisitions or the like with other enterprises. Alternatively, different departments within the same enterprise may have different needs which are best satisfied by different types of computer systems having different types of data repositories. The different data repositories maintained by an enterprise may be located in a variety of different computer systems, which may be dispersed around an office, around a campus, or even around the world.

An employee may utilize an application to enter data relating to the identity of a particular customer. For example, an employee may enter identity data such as the customer's name, date of birth, residential address, business address, network identification, social security number, account numbers, etc. A business may be more efficient by maintaining such identity data. For example, an employee is not required to enter identity data for a particular customer each time the customer interacts with the business because the data is already stored within the computers of the business.

Many businesses maintain many computer systems at various locations. A computer system at one location may differ from a computer system at another location. In particular, application, data and/or databases on one computer system may differ from application, data and/or databases on other computers. Often, data relating to the identity of a particular customer may change. For example, a customer may change residence and the residential address of the customer may need to be updated in the business computers. Because the business applications running on various computers may differ from each other, it may require a substantial amount of time and resources to ensure that changed identity data is updated on each business computer. In addition, it may require a substantial amount of time and resources to search for and to find a particular person or entity. As such, benefits may be realized by improved systems and methods for managing identities in a database system.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
FIG. 1 is a block diagram of one possible configuration of an identity object for a person.

A system for searching identity data is described. A first database includes a plurality of identity records. A computing device includes a processor and memory in electronic communication with the processor. An identity database is stored in the memory and is separate from the first database. The identity database includes the plurality of identity records. Each identity record includes at least two or more data elements. The identity database includes a plurality of past identity records. The past identity records are previous versions of the plurality of identity records. The identity database is searchable by applications in electronic communication with the computing device. The applications in electronic communication with the computing device cannot directly update the identity database.

An identity record may be created in the identity database whenever the identity record is created in the first database. Additionally, an identity record in the identity database may be updated whenever the identity record is updated in the first database.

A method for searching identity data is also disclosed. A plurality of identity records are stored in a first database. The plurality of identity records are stored in an identity database. The identity database is separate from the first database. The identity database is searchable by applications in electronic communication with the identity database, but the applications in electronic communication with the identity database cannot directly update the identity database. Each identity record includes at least two or more data elements. A plurality of past identity records are stored in the identity database. The past identity records are previous versions of the plurality of identity records. A search term is received. A search is performed until one or more matches are found.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The present systems and methods manage the creation, maintenance and sharing of identity objects between disparate business applications and other systems. FIG. 1 is a block diagram of one possible configuration of an identity object 22 for a person. An identity object 22 for a person may include personal or biographical information 24, such as a person's name, date of birth, city of residence, etc. An identity object 22 for a person may also include one or more common governmental identifiers 26 (such as a social security number or tax identification number). An identity object 22 for a business entity may be like the identity object 22 for a person and may include legal names, identifications and governmental identifiers. Identity objects stored in a database may be referred to as identity records. The different pieces of data in the identity object 22 may be referred to as data elements, fields or attributes.

A common business problem that the present systems and methods address is searching a database or data repository to find existing identity objects 22. It is helpful if searches will work with partial search criteria, and if they are simple enough for occasional and untrained users to search effectively. The systems and methods herein may utilize query by example techniques.

Figure 2:
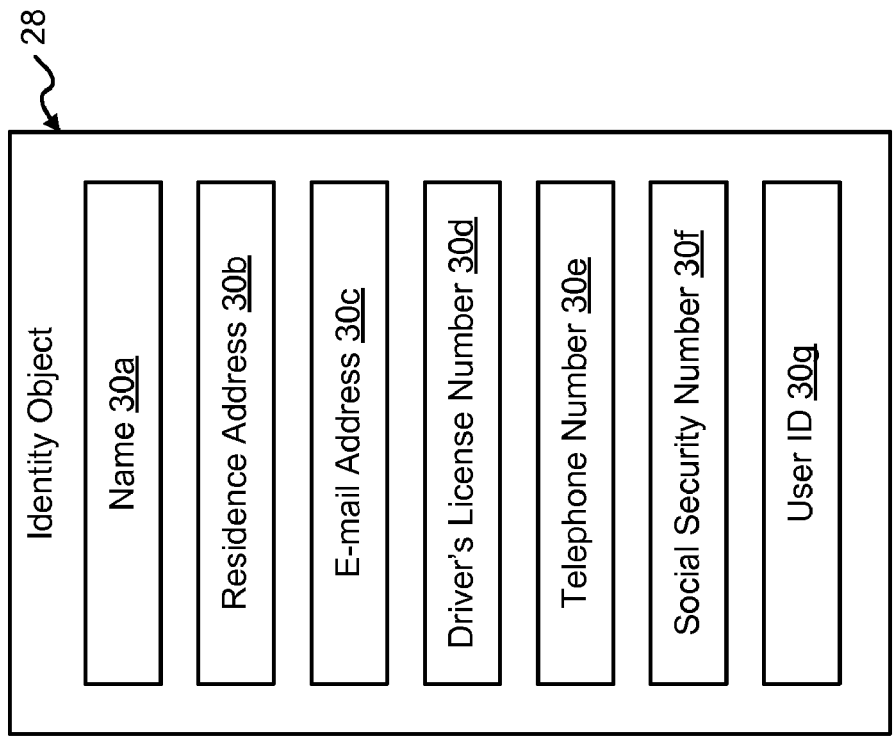
FIG. 2 is a block diagram of another possible configuration of an identity object.

FIG. 2 is a block diagram of another possible configuration of an identity object 28. For example, an identity object 28 may include a person's name 30a, residence address 30b, email address 30c, driver's license number 30d, telephone number 30e, social security number 30f and user-id 30g.

Figure 3:
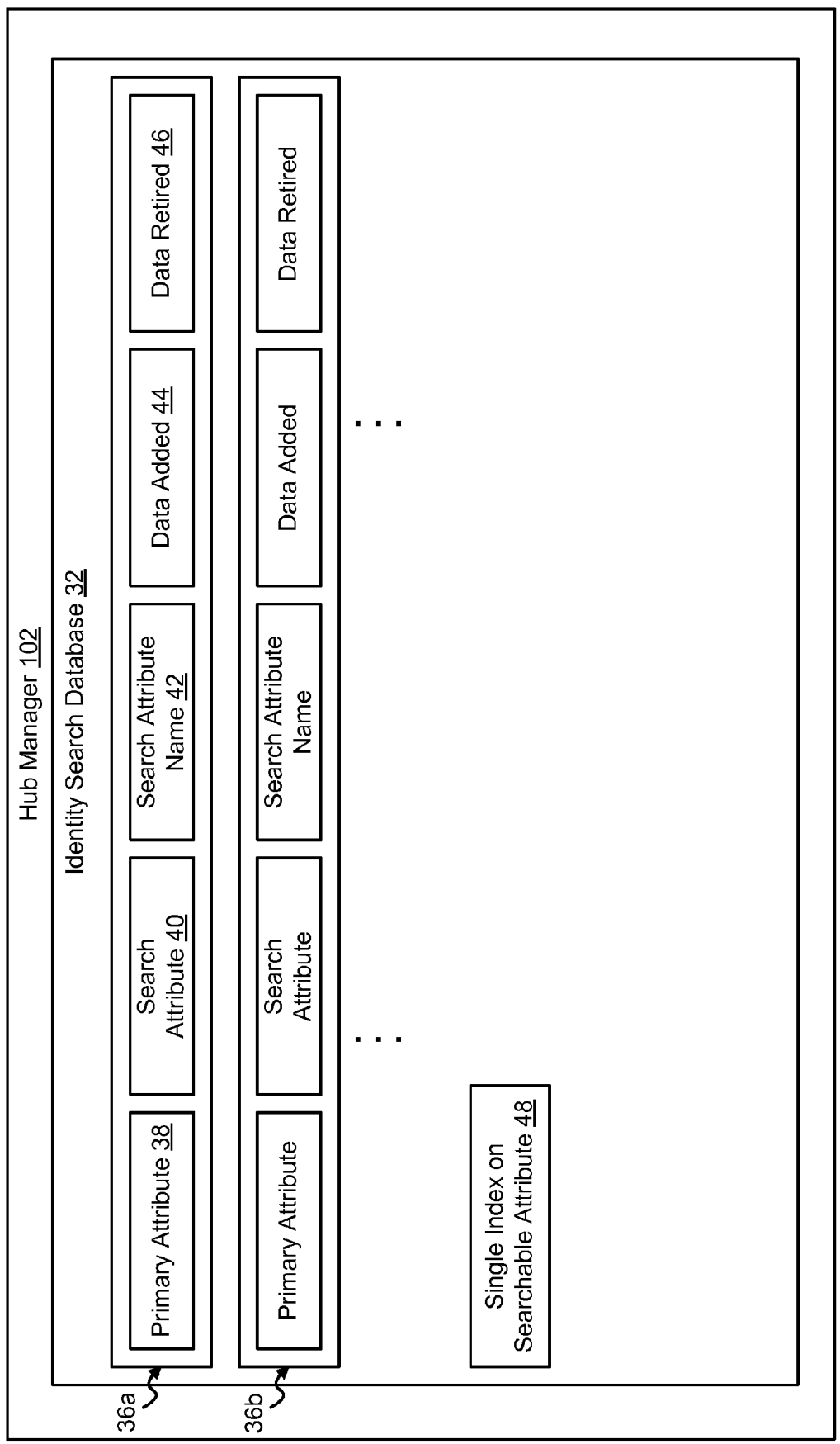
FIG. 3 is a block diagram illustrating one possible configuration of a separate identity database.

FIG. 3 is a block diagram illustrating one possible configuration of a separate identity database 32. The identity database 32 is a separate database table than the regular database 34. The index database 32 is a database table, or index, that is optimized and dedicated for purpose of searching attributes in the index database 34. The index database 32 is organized with one or more columns of data about database 34. The data in the index database 32 is user defined by a system administrator.

The identity database 32 maintains a complete set of identity objects 36a, 36b. The identity database 32, in one possible configuration, may be maintained by a hub manager 102, which is more fully described below. A hub manager 102 maintained identity database table 32 can be searched by any application, but not directly updated by them. Many other kinds of database systems may be used to maintain the identity database 32 besides the hub manager 102. Thus, a hub manager 102 is not required.

An identity object 36, in one configuration, may include a primary attribute 38 of the identity 36. One example of a primary attribute 38 is a system-assigned Customer ID. An identity object 36 may also include a searchable attribute 40 of the identity. Examples of searchable attributes 40 are a social security number (SSN), a driver's license identification number, or a tax identification number. Other possible searchable attributes 40 could be used. A searchable attribute name 42 may also be included (e.g., "SSN" or "Driver's License"). An identity object 36 may also include a date added attribute 44. The system would populate this value 44 with the date the search record was added. A date retired attributed 46 may also be included. The system may populate this value with the date that the attribute 46 was changed to a new value. Other attributes may be used with an identity object 36.

The identity search database table 32 has a single index 48 on the searchable attribute column 40 for database efficiency. It may have other attributes to facilitate maintenance, but these are optional depending on the needs of different customers. All of the searches are directed against the identity search database table 32 rather than performing multiple searches for each attribute being searched, and then merging the results. Since the searches are being directed against the search table 32, it is not necessary to have a database index on every attribute that a user or system may want to search. The search table 32 is an additional search table beyond those containing the attributes.

There are different techniques that may be used to maintain the search table 32. In one technique, an administrator simply defines in which attributes are searchable, and the search table 32 is automatically maintained by the hub manager 102, which will be more fully discussed below. With the hub manager 102 every object that updates an identity-related table includes a check to see if one of the searchable attributes, as defined by the system administrator, is being updated. And, if it is, the hub manager 102 executes a statement to maintain the searchable table 32 as well. An alternative for many applications would be to include this logic in database triggers. When a "searchable" attribute is modified, it could be executed to maintain the search table 32.

Another aspect of the present system is when dealing with old identifiers or old identity objects 36. By way of example, a user may send out a document with a driver's license. If it has returned updated, the user can't find the individual because the values of the driver's license attribute have been changed or updated. The present identity search table 32 solves this problem by simply storing the old identifiers in the search table 32.

Figure 4:
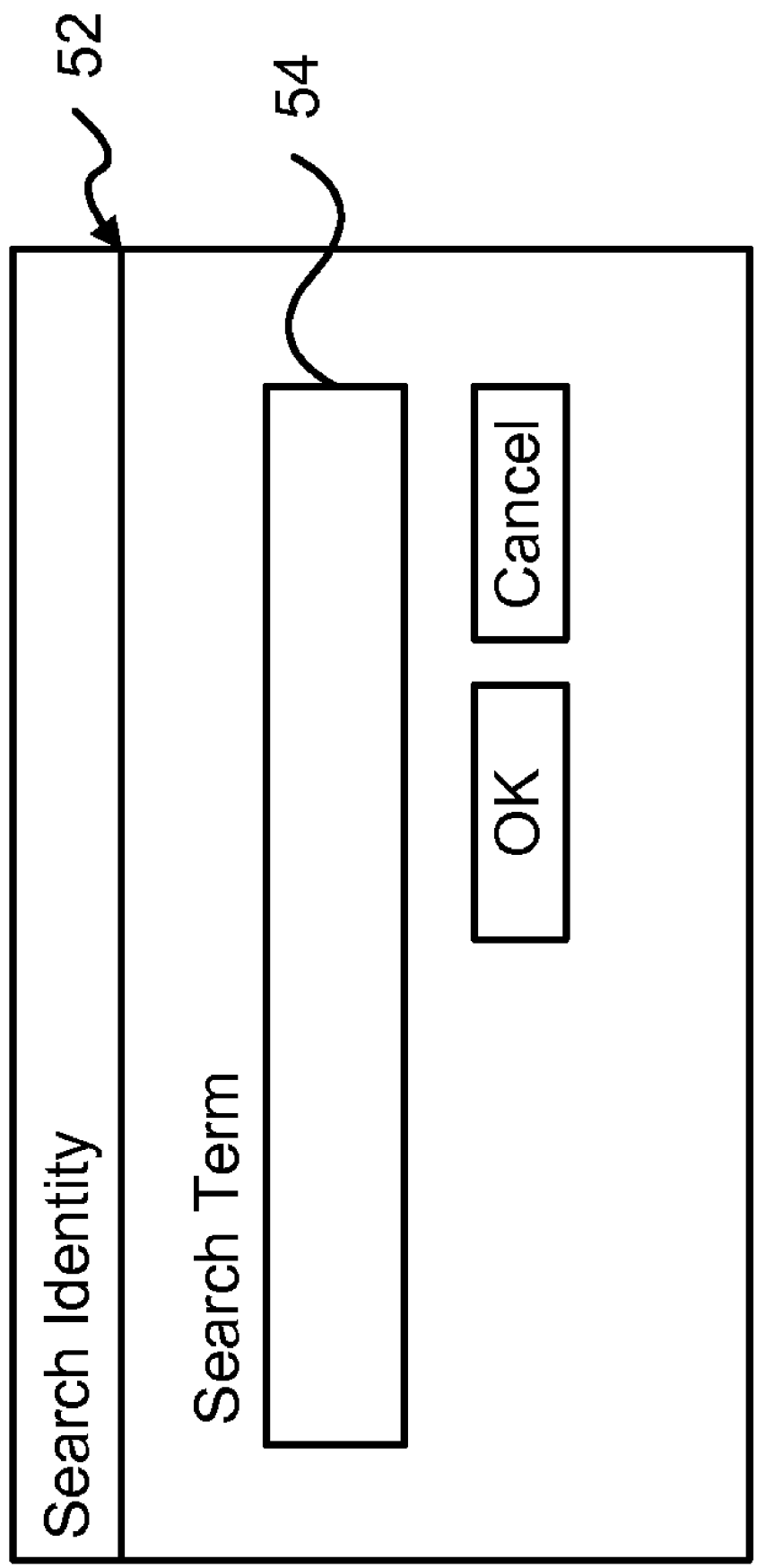
FIG. 4 is an illustration of one possible configuration for a search user interface.

FIG. 4 is an illustration of one possible configuration for a search user interface 52. A user or operator simply enters any identifier that they have in a single search box 54. The system then searches against the identity search database 32. If there is a unique match, the identity object has been located. If there is more that one identity object that matches the entered string, a set is returned for the operator to view so that the proper identity object can be selected. If no identity object is found, a message may be displayed to the user indicating no results were found. This search operation is a single, very efficient database query against a single indexed field.

Many different kinds of databases may include identity objects or identity records as part of the database. These different kinds of databases may be used in combination with the identity searching systems and methods discussed herein. One possible implementation of a database management system that has the ability to integrate multiple databases and/or systems will be set forth below with references to FIGS. 5-7. Although the discussion in FIGS. 5-7 may be more general in its description, the systems and methods therein may be used as an exemplary database system with which identity objects and identity object searching, as discussed above, may be used. For example, a hub manager, discussed below, may be used to manage the identity database, described above. Reference objects, also discussed below, may be examples of identity objects.

Most business applications include two general types of data. The first may be transactional data. Examples of transactional data may include orders, shipments, invoices, payments, etc. Transactional data may utilize a high degree of control in order to maintain its integrity. This type of data may be managed by a single, highly integrated application, which may be highly dynamic or attended by a large volume of activity.

The second type of data may include reference data. Examples of reference data may include customers, employees, products, services, accounts, locations, etc. While an important level of control may be utilized in order for reference data to maintain its integrity, it may be common for several business applications in an enterprise to maintain the same reference data. It may be beneficial if this type of data could be created, edited, changed, deleted, etc. by each individual business application in the manner that it was designed to function. Further, it would be beneficial if each individual business application could share common data with the other business applications in the enterprise. For example, it may be beneficial if all of the systems in a business that deal with a certain customer could identify that customer in the same way.

Transactional data may be controlled by tightly-coupled data management techniques. For example, a change to an order amount may occur in the same database transaction that affects the inventory levels of the product. However, tightly-coupled application systems are more expensive to develop and maintain than loosely-coupled application systems.

Reference data generally doesn't require tightly-coupled data management techniques. Instead, this type of data can generally be handled with loosely-coupled data management techniques. A change to an individual's address in one application should be shared with all of the other applications within the business enterprise, but it may be acceptable if it takes several seconds or minutes to synchronize this changed data with the other applications.

The present systems and methods enable a business enterprise to loosely-couple reference data with the multiple business systems, applications and infrastructure. The present systems and methods may loosely-couple reference data with asynchronous messages which may guarantee delivery of the message to each system and application within the business enterprise. For example, the present systems and methods allow an application to complete a change to an attribute associated with reference data and continue the normal operations the application is designed to perform. The present systems and methods may operate in the background and send a message including information about the change to additional systems and applications within the business enterprise. When the additional applications are available, they may accept the message and process the change and apply whatever business rules are applicable for their specific business processes.

A benefit of the present systems and methods is that if any systems are unavailable for any reason (i.e. off-line) the integrity of the reference data will not be jeopardized. The remaining systems that are available will continue to be synchronized and continue functioning with accurate, updated data attributes.

Current systems and methods generally require data structures of the different applications to be identical or very similar. At the very least, the reference data typically has been required to share a common data attribute that uniquely identifies reference data. Such requirements have not enabled current systems and methods to be sufficiently loosely-coupled. Further, it is expensive for dissimilar applications to share reference data.

Figure 5:
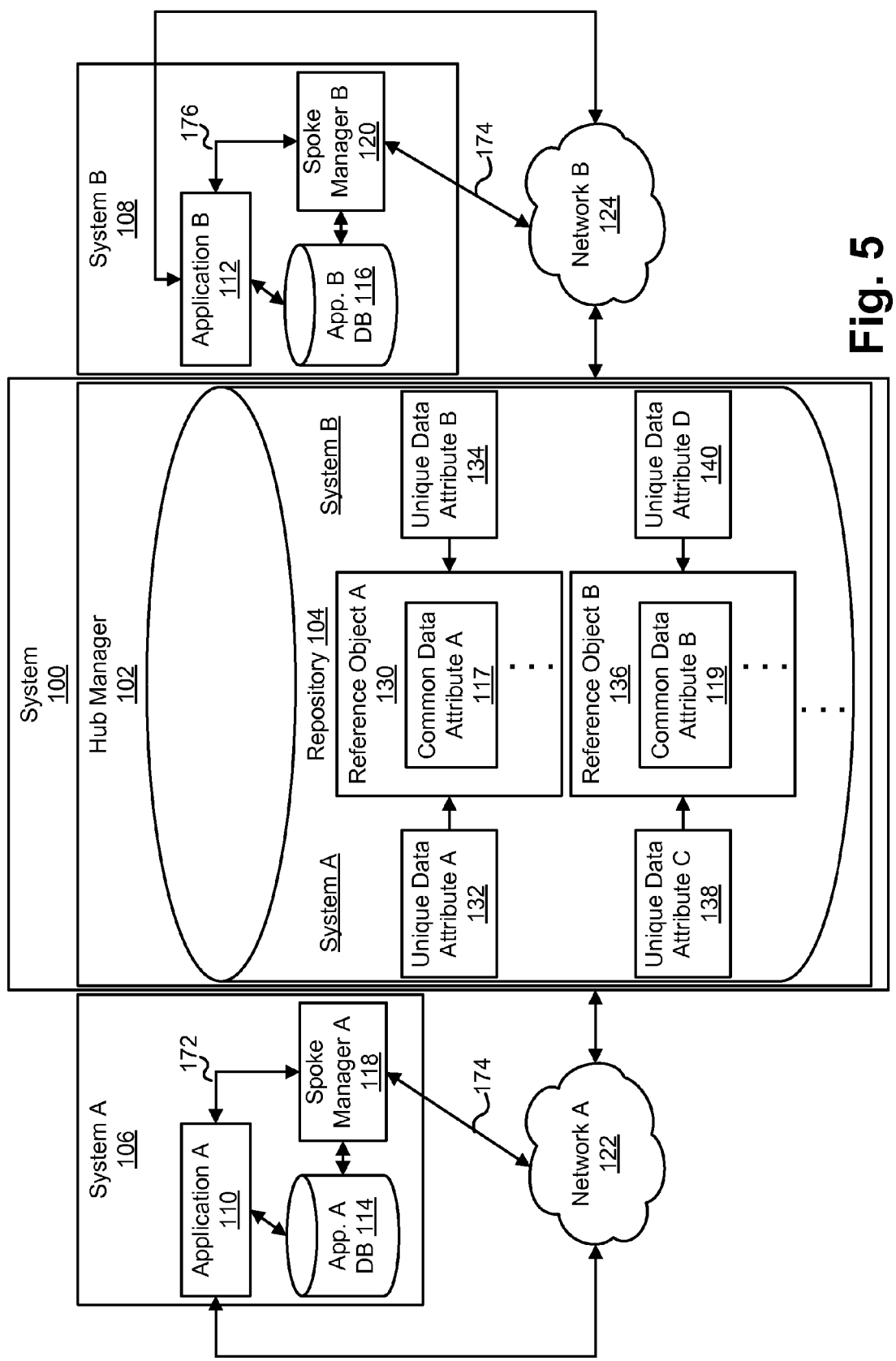
FIG. 5 is a block diagram illustrating one embodiment of a system in communication with a plurality of systems and applications.

FIG. 5 is a block diagram illustrating one embodiment of a system 100 in communication with system A 106 and system B 108. Although FIG. 5 only depicts the system 100 in communication with the two systems 106, 108, it is to be understood that the system 100 may be in communication with more than two systems. For example, numerous systems may be connected in a star configuration with the system 100 at the center. In some embodiments the different systems 100, 106, 108 may be located in different geographic regions across a country and/or across the world. In other embodiments the different systems 100, 106, 108 may be located within the same facility.

System A 106 and system B 108 may include any type of computing device such as a personal computer, laptop, personal digital assistant (PDA), computer server, etc. Systems A and B 106, 108 may include application A 110 and application B 112, respectively. Applications A and B 110, 112 may include software that employs the capabilities of systems A and B 106, 108 to execute a task. In one embodiment, applications A and B 110, 112 may utilize different data structures. Different data structures may be suited to different types of applications, such as applications A and B 110, 112.

Systems A and B 106, 108 may also include application A database 114 and application B database 116, respectively. The databases 114, 116 may include a stored collection of data that may be accessed by applications A and B 110, 112. In one embodiment, systems A and B 106, 108 may also include spoke manager A 118 and spoke manager B 120, respectively. Spoke managers A and B 118, 120 may send/receive data to/from applications A and B 110, 112, respectively. In addition, spoke managers A and B 118, 120 may send/receive data to/from application A database 114 and application B database 116, respectively. In one embodiment, spoke manager A 118 sends/receives data to/from application A 110 in a first format 172. In another embodiment, spoke manager B 120 sends/receives data to/from application B 112 in a second format 176. The first format 172 may be different from the second format 176. Spoke manager A 118 may also send/receive data to/from the system 100. In one embodiment, spoke manager A 118 sends/receives data to/from the system 100 in a third format 174. In another embodiment, spoke manager B 120 also sends/receives data to/from the system 100 in the third format 174.

Spoke managers A and B 118, 120 may communicate with the system 100 over network A 122 and network B 124, respectively. While the illustrated embodiment only illustrates two networks, it is to be understood that the system 100 may communicate with any number of systems over any number of networks. In one embodiment, the system 100 includes a hub manager 102. The hub manager 102 may act as a broker for all the data sent to or received from the various systems and applications. For example, the hub manager 102 may send/receive messages to/from the various systems and applications. In one embodiment, the hub manager 102 may include a repository 104. The repository 104 may store data included within the various systems communicating with the system 100, such as systems A and B 106, 108. In one embodiment, repository 104 may include a plurality of reference objects, such as reference object A 130 and reference object B 136. Reference object A and B 130, 136 may be a record of data relating to the identity of an individual, product, etc. For example, reference object A 130 may be an employee record and reference object B 136 may be a customer record. Each reference object includes common data attributes. Reference object A 130 may include common data attributes A 117 and reference object B 136 may include common data attributes B 119. Common data attributes may include data that is shared between systems, such as system A 106 and system B 108. An example of a common data attribute may include the name of the entity being identified by the reference object. Further examples of common data attributes may include an address, date of birth, email address, etc.

In one embodiment, spoke managers may be deployed to each system and application within a business enterprise. Spoke managers may communicate directly with the hub manager 102 and translate standard messages sent from the hub manager 102 to the system or application. Data translations or data transformations may include data mapping and data formatting. In one embodiment, data mapping identifies the location of specific required data in a table of one system and application and "maps" it to a location of data with the same attributes of another system and application. In one embodiment, data formatting defines a physical format of the data.

Each spoke manager may be very specific to the particular business system or application on which it resides. Including spoke managers with every system and application may allow a business enterprise to scale more easily. For example, the addition of another business application simply means adding a new spoke manager specific to that application. In one embodiment, adding additional systems or applications does not require changes to the hub manager 102 because the spoke manager provides the translation of data formats between the systems and applications and the hub manager 102. In one embodiment, business systems and applications may be deployed on a variety of technology platforms, data management tools and application development environments.

Spoke manager A 118 and spoke manager B 120 may implement a unique data attribute to uniquely identify each reference object. For example, spoke manager A 118 may implement unique data attribute A 132 and spoke manager B 120 may implement unique data attribute B 134 to identify reference object A 130. Similarly, spoke manager A 118 may implement unique data attribute C 138 and spoke manager B 120 may implement unique data attribute D 140 to uniquely identify reference object B 136. In one embodiment, the repository is aware of each unique data attribute and the value of such attribute that each spoke manager implements to identify a particular reference object. The following scenario may further illustrate this concept.

A human resource system of a business may implement the unique data attribute of "Employee_id" to uniquely identify the reference object of an employee record of the employee associated with the employee identification indicated by "Employee_id". An accounting system of the same business may use the unique data attribute of "Employee_tax_id" to uniquely identify the employee record of an employee. For purposes of illustration, the "Employee_id" may be "789" and the "Employee_tax_id" may be "A52". The employee record may include one or more common data attributes, such as name, address, date of birth, etc. In one embodiment, the employee with the "Employee_id" of "789" may change his/her address through an application on the human resource system. The accounting system may not be able to be updated with the new address because the accounting system identifies employee records with a different data attribute (i.e., "Employee_tax_id").

In one embodiment, the repository 104 stores the employee's information such that the hub manager is aware that the employee identification is "789" and the employee tax identification is "A52". The repository 104 may translate a message associated with "Employee_id=789" that is updating a common data attribute to a message that includes "Employee_tax_id=A52" before the message is sent to the accounting system.

In this embodiment, the hub manager 102 is aware of which unique data attribute (and its value) each spoke manager uses to uniquely identify a reference object. The hub manager 102 is also aware of each of the plurality of reference objects that a particular enterprise may use (i.e., employee records, customer records, product record, etc.). Further, the hub manager 102 is aware of each common data attribute included with each reference object. The repository 104 associates each reference object with the unique data attribute each spoke manager uses to uniquely identify the reference object.

Figure 6:
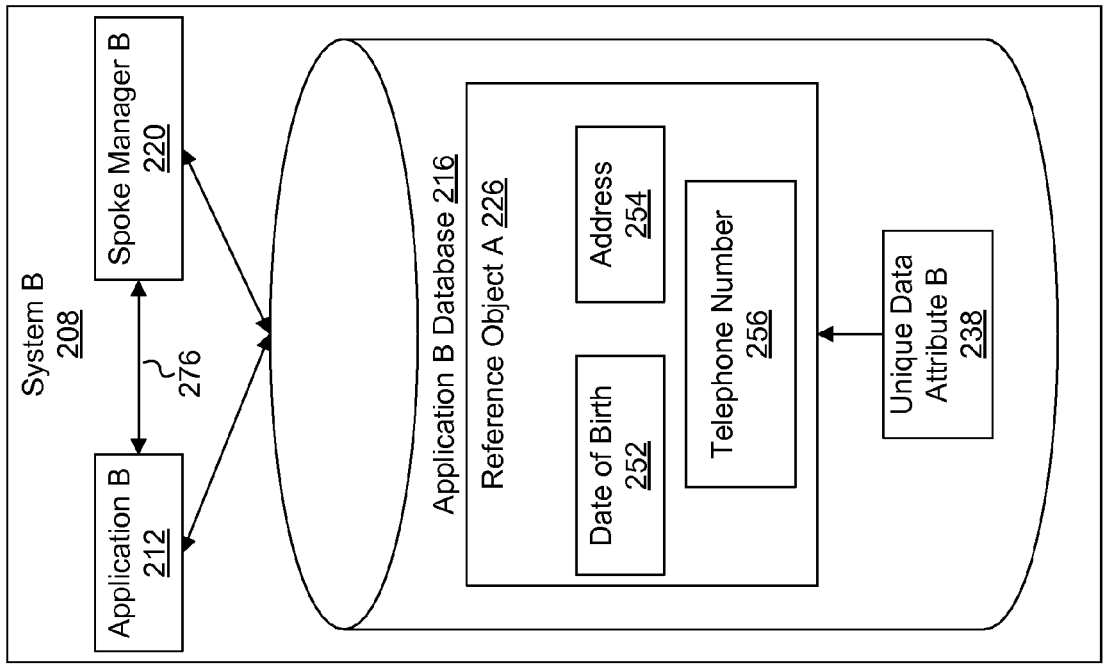
FIG. 6 is a block diagram illustrating embodiments of databases.
Figure 6:
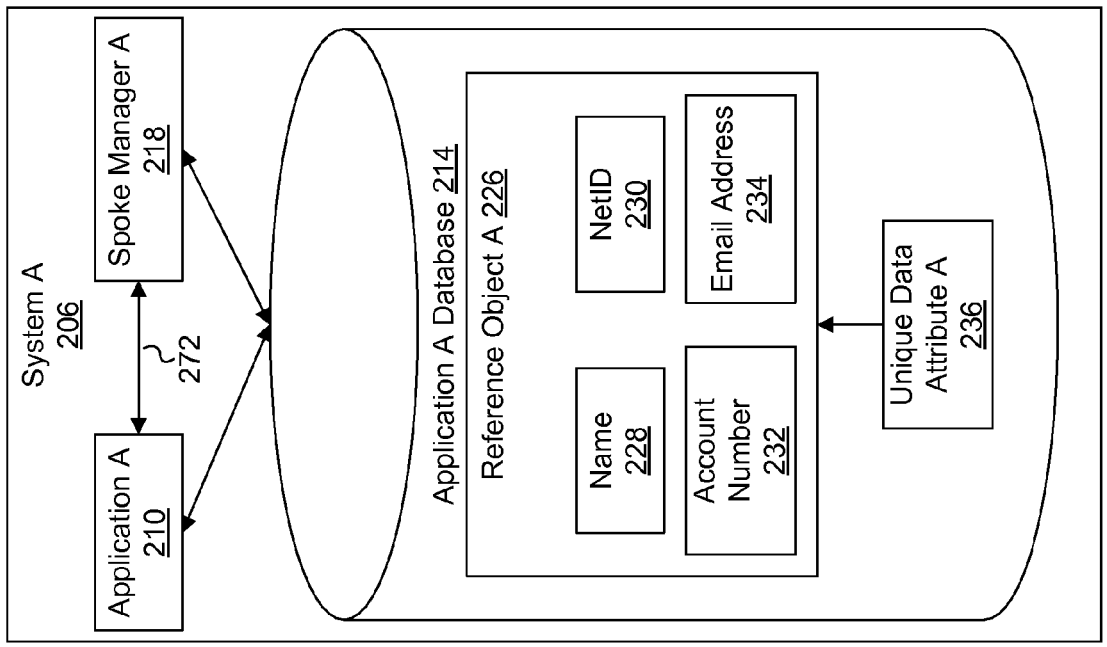

FIG. 6 is a block diagram illustrating embodiments of databases. As illustrated, spoke manager A 218 may send/receive data to/from application A 210 using a first data format 272. Spoke manager B 220 may send/receive data to/from application B 212 using a second data format 276. Applications A and B 210, 212 may obtain data from application A database 214 and application B database 216, respectively. In one embodiment, spoke manager A 218 may communicate directly with application A database 214 and spoke manager B 220 may communicate directly with application B database 216.

Application A database 214 and application B database 216 may include one or more reference objects, such as reference object A 226. Reference object A 226 may identify a particular type of entity that is associated with one or more common data attributes. For example, reference object A 226 may identify customers, employees, business entities, products, services, accounts, locations, etc. In one embodiment, reference object A 226 may include common data attributes relating to the entity identified by reference object A 226. In the depicted embodiment, the reference object A 226 identifies a customer and may include common data attributes further relating to the identity of the customer. It is to be understood that additional reference objects may include common data attributes that further relate to the identity of other entities in addition to customers. In one embodiment, reference object A 226 includes common data attributes such as name 228, NetID 230, account number 232 and email address 234. While only four examples of common data attributes are listed, it is to be understood that reference object A 226 may include other common data attributes. For example, common data attributes may include date of birth, residential address, business address, social security number, account numbers, etc.

Spoke manager A 218 and spoke manager B 220 may each uniquely identify the reference object A 226 with a different unique data attribute. For example, spoke manager A 218 may identify reference object A 226 using unique data attribute A 236 while spoke manager B 220 identifies reference object A 226 using unique data attribute B 238.

In addition, application A 210 and application B 212 may use different common data attributes of reference object A 226. For example, application A 210 may use the common attributes of name 228, NetID 230, account number 232 and email address 234. Application may use the common data attributes of data of birth 252, address 254 and telephone number 256.

Figure 7:
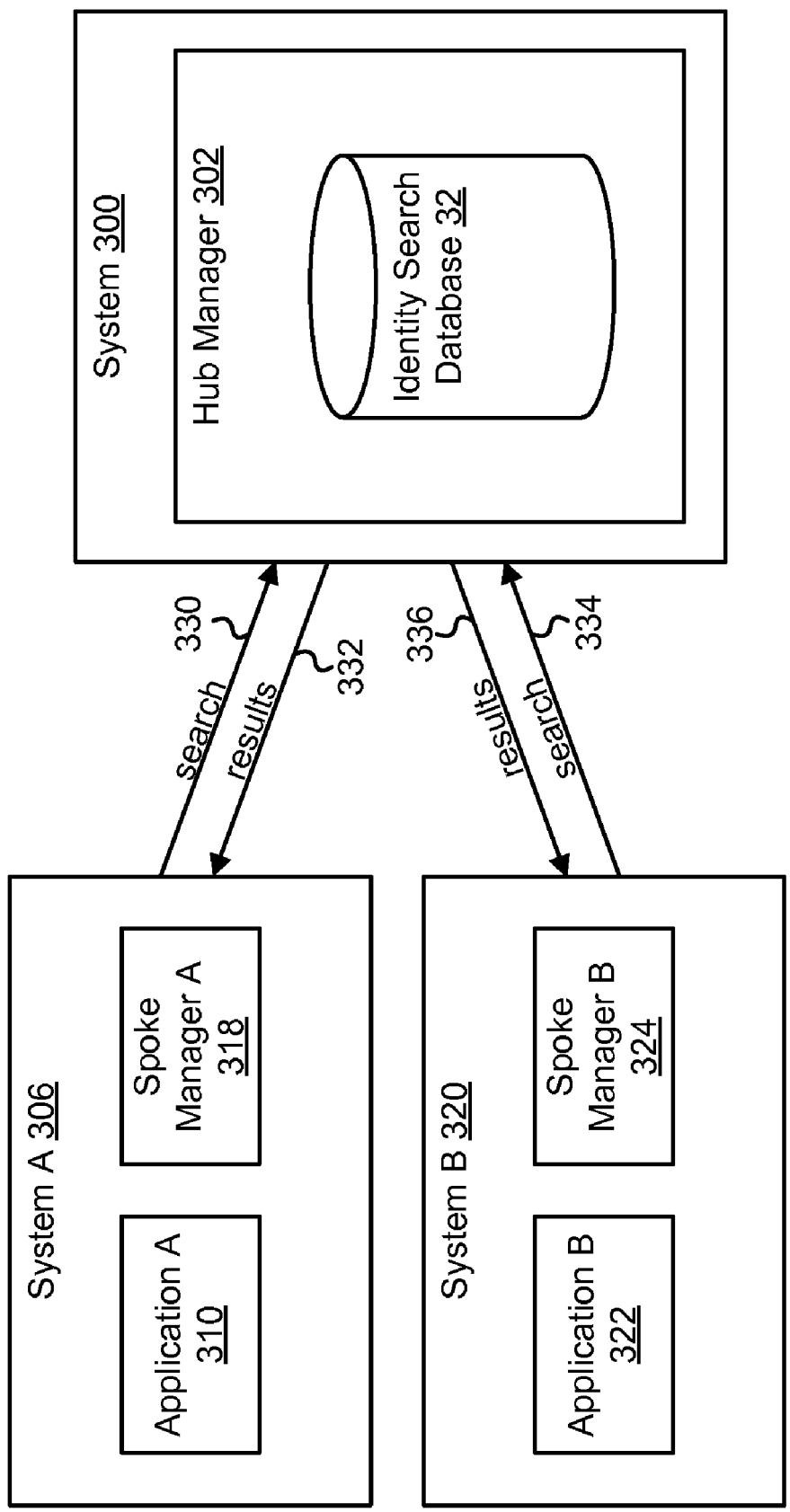
FIG. 7 is a block diagram illustrating different systems using the identity search database for searching.

FIG. 7 is a block diagram illustrating different systems 306, 320 using the identity search database 32 for searching. As shown and discussed, the identity search database 32 is maintained by the hub manager 302 on the hub manager system 300. In one embodiment, system A 306 communicates with a system 300 over network (not shown). Application A 310 and spoke manager A 318 may be included within system A 306. In one embodiment, application A 310 facilitates a customer to perform a search. Application A 310 may communicate the search to the spoke manager 318. In one embodiment, spoke manager A 318 may send the search 330 to the hub manager 302. The hub manager 302 then searches against the identity search database 32 and returns the results 332.

In this configuration, system B 320 communicates with the system 300 over network (not shown). Application B 322 and spoke manager B 324 may be included within system B 320. Application B 322 may facilitate a customer performing a search. Application B 322 may communicate the search to the spoke manager 324. In one embodiment, spoke manager B 324 may send the search 334 to the hub manager 302. The hub manager 302 then searches against the identity search database 32 and returns the results 336.

The hub manager 302 may act as a broker for all the searches and data sent to or received from the various systems and applications. For example, the hub manager 302 may send/receive messages to/from the various systems and applications relating to searches being performed or with updates to the information in the identity search database 32. In one possible configuration, the reference objects referred to herein may be implementations of identity objects in the identity search database 32.

Figure 8:
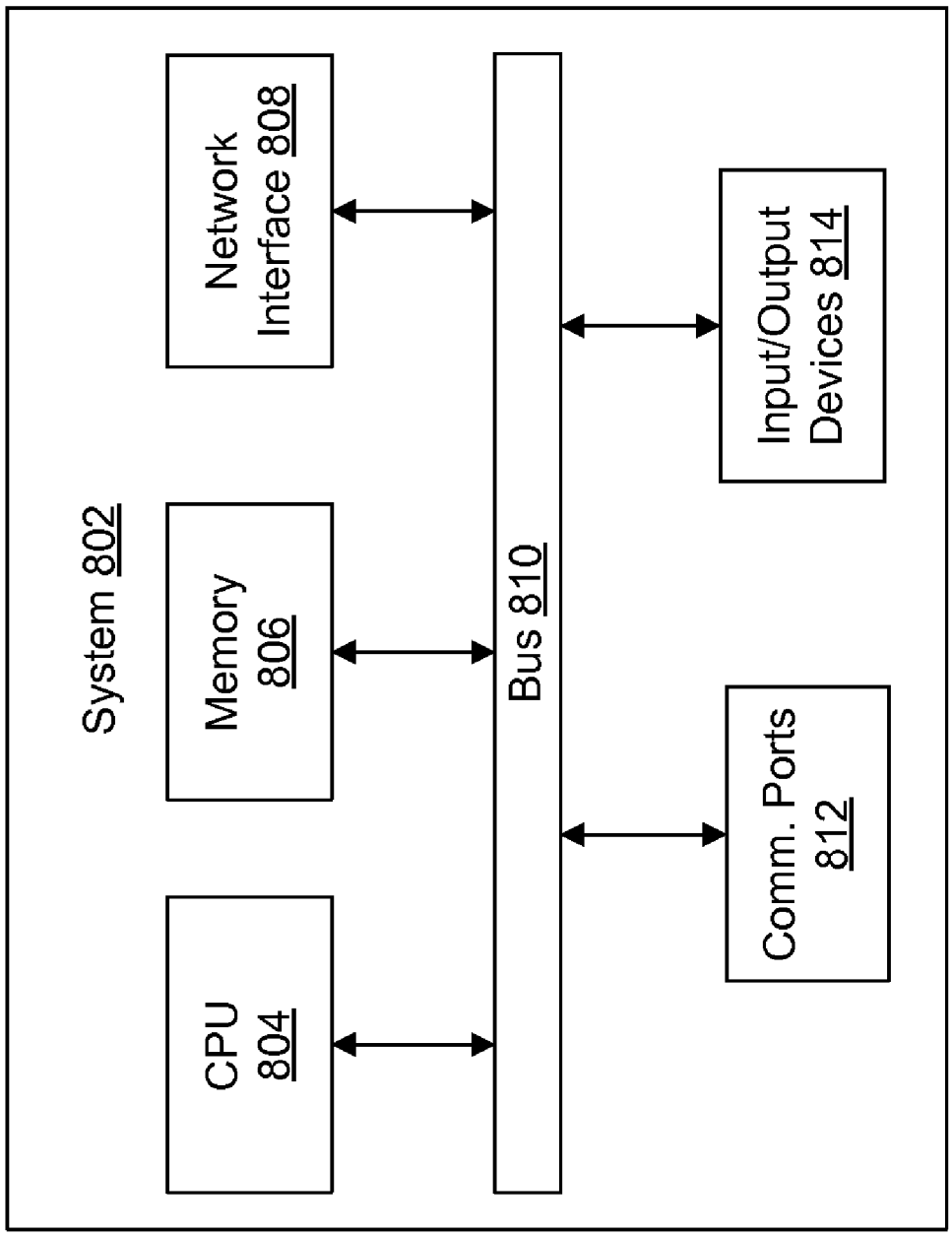
FIG. 8 is a block diagram of hardware components that may be used in an embedded device that is configured according to an embodiment.

FIG. 8 is a block diagram of hardware components that may be used in a system 802 that is configured according to an embodiment. A central processing unit (CPU) 804 or processor may be provided to control the operation of the system 802, including the other components thereof, which are coupled to the CPU 804 via a bus 810. The CPU 804 may be embodied as a microprocessor, microcontroller, digital signal processor or other device known in the art. The CPU 804 performs logical and arithmetic operations based on program code stored within the memory. In certain embodiments, the memory 806 may be on-board memory included with the CPU 804. For example, microcontrollers often include a certain amount of on-board memory.

The system 802 may also include a network interface 808. The network interface 808 facilitates communication between the system 802 and other devices connected to a network, which may be a pager network, a cellular network, a global communications network, the Internet, a computer network, a telephone network, etc. The network interface 808 operates according to standard protocols for the applicable network.

The system 802 may also include memory 806. The memory 806 may include random access memory (RAM) for storing temporary data. Alternatively, or in addition, the memory 806 may include read-only memory (ROM) for storing more permanent data, such as fixed code and configuration data. The memory 806 may also be embodied as a magnetic storage device, such as a hard disk drive. The memory 806 may be any type of electronic device capable of storing electronic information.

The system 802 may also include one or more communication ports 812, which facilitate communication with other devices. The system 802 may also include input/output devices 814, such as a keyboard, a mouse, a joystick, a touchscreen, a monitor, speakers, a printer, etc.

Of course, FIG. 8 illustrates only one possible configuration of a system 802. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for searching identity data, the system comprising:
a first database, wherein the first database includes a plurality of identity records;
a computing device comprising:
a processor;
memory in electronic communication with the processor;
an identity database stored in the memory, wherein the identity database is separate from the first database, and wherein the identity database comprises:
the plurality of identity records, wherein each identity record includes at least two or more data elements;
a plurality of past identity records, wherein the past identity records are previous versions of the plurality of identity records;
wherein the identity database is searchable by applications in electronic communication with the computing device, and wherein the applications in electronic communication with the computing device cannot directly update the identity database but can directly update the first database, wherein the system is configured to update an identity record in the identity database whenever the identity record is updated in the first database, and wherein a hub managing system manages the identity database;
wherein each of the applications in electronic communication with the computing device communicate with the identity database via a separate spoke manager, wherein a search request issued by an application is translated from a first format to a second format via the spoke manager, the second format being usable by the identity database, wherein each application in communication with the computing device identifies an identity record using a reference object that has a plurality of unique data attributes, and wherein each spoke manager identifies the record with a different data attribute;
wherein a first application communicates with the identity database via a first spoke manager and a second application communicates with the identity database via a second spoke manager, wherein the first spoke manager translates a search request issued by the first application from the first format to the second format and the second spoke manager translates a search request issued by the second application from a third format to the second format, wherein the first format and the third format are not the same; and
wherein the first spoke manager identifies the record with a first data attribute and the second spoke manager identifies the record with a second data attribute, wherein the first data attribute and the second data attribute are not the same.

2. The system of claim 1, wherein the system is configured to create an identity record in the identity database whenever the identity record is created in the first database.

3. The system of claim 1, wherein the at least two data elements comprise at least one piece of personal information and at least one governmental identifier.

4. A method for searching identity data, the method comprising:
storing in a first database a plurality of identity records;
storing in an identity database the plurality of identity records, the identity database being stored in memory of a computing device, the memory being in electronic communication with a processor, wherein the identity database is separate from the first database, wherein the identity database is searchable by applications in electronic communication with the identity database, and wherein the applications in electronic communication with the identity database cannot directly update the identity database but can directly update the first database, wherein the system is configured to update an identity record in the identity database whenever the identity record is updated in the first database, wherein a hub managing system manages the identity database and wherein each identity record includes at least two or more data elements;
storing in the identity database a plurality of past identity records, wherein the past identity records are previous versions of the plurality of identity records;

receiving a search term;

searching until one or more matches are found;

wherein each of the applications in electronic communication with the computing device communicate with the identity database via a separate spoke manager, wherein a search request issued by an application is translated from a first format to a second format via the spoke manager, the second format being usable by the identity database, wherein each application in communication with the computing device identifies an identity record using a reference object that has a plurality of unique data attributes, and wherein each spoke manager identifies the record with a different data attribute;

wherein a first application communicates with the identity database via a first spoke manager and a second application communicates with the identity database via a second spoke manager, wherein the first spoke manager translates a search request issued by the first application from the first format to the second format and the second spoke manager translates a search request issued by the second application from a third format to the second format, wherein the first format and the third format are not the same; and wherein the first spoke manager identifies the record with a first data attribute and the second spoke manager identifies the record with a second data attribute, wherein the first data attribute and the second data attribute are not the same.

5. The method of claim 4, further comprising, whenever a new identity record is created in the first database, creating the new identity record in the identity database.

6. The method of claim 4, wherein the at least two data elements comprise at least one piece of personal information and at least one governmental identifier.

\* \* \* \* \*